(12) United States Patent
Gren et al.

(10) Patent No.: US 9,990,536 B2
(45) Date of Patent: Jun. 5, 2018

(54) COMBINING IMAGES ALIGNED TO REFERENCE FRAME

(71) Applicant: Microsoft Technology Licensing, LLC, Redmond, WA (US)

(72) Inventors: Juuso Petteri Gren, Kyroskoski (FI); Martti Olavi Ilmoniemi, Nokia (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/227,805

(22) Filed: Aug. 3, 2016

(65) Prior Publication Data

US 2018/0039821 A1 Feb. 8, 2018

(51) Int. Cl.
*G06K 9/18* (2006.01)
*G06K 9/00* (2006.01)
*H04N 5/232* (2006.01)
*G06T 7/00* (2017.01)
*G06F 3/0484* (2013.01)

(52) U.S. Cl.
CPC ..... *G06K 9/00228* (2013.01); *G06F 3/04842* (2013.01); *G06T 7/0024* (2013.01); *H04N 5/232* (2013.01); *G06T 2200/24* (2013.01)

(58) Field of Classification Search
USPC ................................. 382/275, 118
See application file for complete search history.

(56) References Cited

U.S. PATENT DOCUMENTS

| 5,151,784 | A | 9/1992 | Lavagetto et al. |
| 7,720,148 | B2 | 5/2010 | Au et al. |
| 8,265,145 | B1 | 9/2012 | Pejhan et al. |
| 8,619,855 | B2 | 12/2013 | Li |
| 2004/0161157 | A1 | 8/2004 | Sato et al. |
| 2007/0237423 | A1 | 10/2007 | Tico et al. |
| 2008/0170126 | A1 | 7/2008 | Tico et al. |
| 2009/0238278 | A1 | 9/2009 | Mauchly et al. |

(Continued)

FOREIGN PATENT DOCUMENTS

| CN | 102186078 A | 9/2011 |
| CN | 102905058 A | 1/2013 |

OTHER PUBLICATIONS

McVeigh, et al., "Adaptive Reference frame selection for Generalized Video Signal Coding", In Proceedings of SPIE, Digital Video Compression Algorithms and Technologies, Mar. 22, 1996, 9 pages.

(Continued)

*Primary Examiner* — Jerome Grant, II (57) ABSTRACT

In various examples there is an image combiner comprising a memory storing two or more frames being images depicting the same scene; and at least one processor. The memory holds instructions executable by the processor to select at least one of the frames and designate it as a reference frame and to designate the other frames as target frames. The instructions align the target frames to the reference frame and compute an output image by combining the reference frame and the aligned target frames. The process of selecting the reference frame comprises any one or more of: local analysis of characteristics of the frames, face detection, smile detection, object detection, computing signal to noise ratio of individual frames, use of sensor data from at least one non-camera sensor.

20 Claims, 4 Drawing Sheets

(56) References Cited

U.S. PATENT DOCUMENTS

| | | | |
|---|---|---|---|
| 2011/0116701 A1 | 5/2011 | Zhu et al. | |
| 2012/0026317 A1* | 2/2012 | Nakahira | H04N 7/183 |
| | | | 348/92 |
| 2012/0027092 A1 | 2/2012 | Matsui | |
| 2012/0128059 A1 | 5/2012 | Chuang | |
| 2012/0249826 A1* | 10/2012 | Kobayashi | G06K 9/036 |
| | | | 348/222.1 |
| 2013/0222645 A1 | 8/2013 | Bilcu | |
| 2014/0362256 A1 | 12/2014 | Schulze et al. | |
| 2015/0029349 A1 | 1/2015 | Ben Israel et al. | |
| 2015/0139394 A1* | 5/2015 | Kang | A61B 6/5211 |
| | | | 378/62 |
| 2015/0262341 A1 | 9/2015 | Nash et al. | |
| 2016/0028966 A1 | 1/2016 | Sheikh et al. | |

OTHER PUBLICATIONS

"International Search Report and Written Opinion Issued in PCT Application No. PCT/US2017/043822", dated Oct. 13, 2017, 12 Pages.

* cited by examiner

COMBINING IMAGES ALIGNED TO REFERENCE FRAME

BACKGROUND

Multiple images (also referred to as frames) are combined after they have been aligned to a reference frame, for applications such as high dynamic range (HDR) photography, noise filtering and others. High dynamic range photography is a process for representing a greater range of luminance levels in an image than can be achieved using traditional digital or analog photography. For example HDR images can represent real-world scenes containing both heavy shade and bright sunlight. Noise filtering by combining multiple images comprises computing an aggregation of many frames depicting the same scene in a manner so as to reduce the amount of noise in the output image.

Multiple images or frames are increasingly available from camera phones, web cameras, and other types of cameras. For example, bracketing whereby a plurality of frames are captured using different camera parameters for different ones of the frames is often used for HDR photography. For example, burst photography, whereby a plurality of frames are captured rapidly in a temporal sequence is available on many camera phones.

The embodiments described below are not limited to implementations which solve any or all of the disadvantages of known systems for combining images.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an image combiner comprising a memory storing two or more frames being images depicting the same scene; and at least one processor. The memory holds instructions executable by the processor to select at least one of the frames and designate it as a reference frame and to designate the other frames as target frames. The instructions align the target frames to the reference frame and compute an output image by combining the reference frame and the aligned target frames. The process of selecting the reference frame comprises any one or more of: local analysis of characteristics of the frames, face detection, smile detection, object detection, computing signal to noise ratio of individual frames, use of sensor data from at least one non-camera sensor.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

The term frame is used herein to refer to an image such as a digital image captured by a color camera, a monochrome camera, a web camera, a video camera, an infra-red camera, a depth camera, a stereo camera, a time of flight camera, a medical imaging device or other image sensor.

Multi-frame image processing systems act to combine a plurality of frames to form an output image with improved quality as compared with individual ones of the input frames. For example, to compute high dynamic range (HDR) images, to compute super-resolution images, to denoise images, to deblur images, to produce images with ambient light and fine detail by combining multiple flash and no-flash images, and for other purposes. The frames depict the same scene, or at least part of the same scene. For example, the frames have been taken by the same camera at different times, or have been taken by different cameras from slightly different viewpoints. The camera(s) may be moving but any motion is such that there is overlap between the scene depicted in the frames. In some cases the parameters of the camera(s) are the same for each frame and in some cases the parameters of the camera(s) vary between frames. For example, a burst of images taken by a camera phone typically comprises a plurality of frames captured by the same camera in quick succession with the same exposure time, optical system parameters, and other settings. For example, a bracket of frames taken by a digital camera for HDR photography typically comprises a plurality of frames captured by the same camera in quick succession but with different exposure times.

In order to combine or aggregate information from the plurality of frames, the frames are first aligned. Aligning the frames comprises selecting one of the plurality of the frames as a reference frame and then aligning each other frame (referred to as a target frame) to the reference frame. Aligning frames or images is also known as image registration. Any known frame alignment process is used. For example, intensity-based frame alignment is used whereby intensity patterns in the frames are compared using correlation metrics. The target frame is transformed iteratively using the correlation metric as a way to direct the search for a good alignment. Aligning a target frame to the reference frame using feature-based methods involves identifying pixels in the reference frame and the frame to be aligned, which depict the same feature in the scene. A geometrical transformation is computed from the corresponding pixels and used to transform the target frame.

In various embodiments described herein, ways of selecting the reference frame are described which give improved quality of results as compared with previous solutions. That is, selection of the reference frame has influence on the output image produced by combining the aligned frames. For example, the reference frame is selected in an informed manner by using one or more of: local analysis of the frames, content analysis of the frames such as face detection, smile detection, object detection and others, noise analysis of the frames, other sensor information. In some cases more than one reference frame is used. In some cases the reference frame is selected in an iterative process whereby an initial reference frame is later updated. As a result there is a processing apparatus which gives high quality images as output, where the output images are formed by combining information from a plurality of frames.

Figure 1:
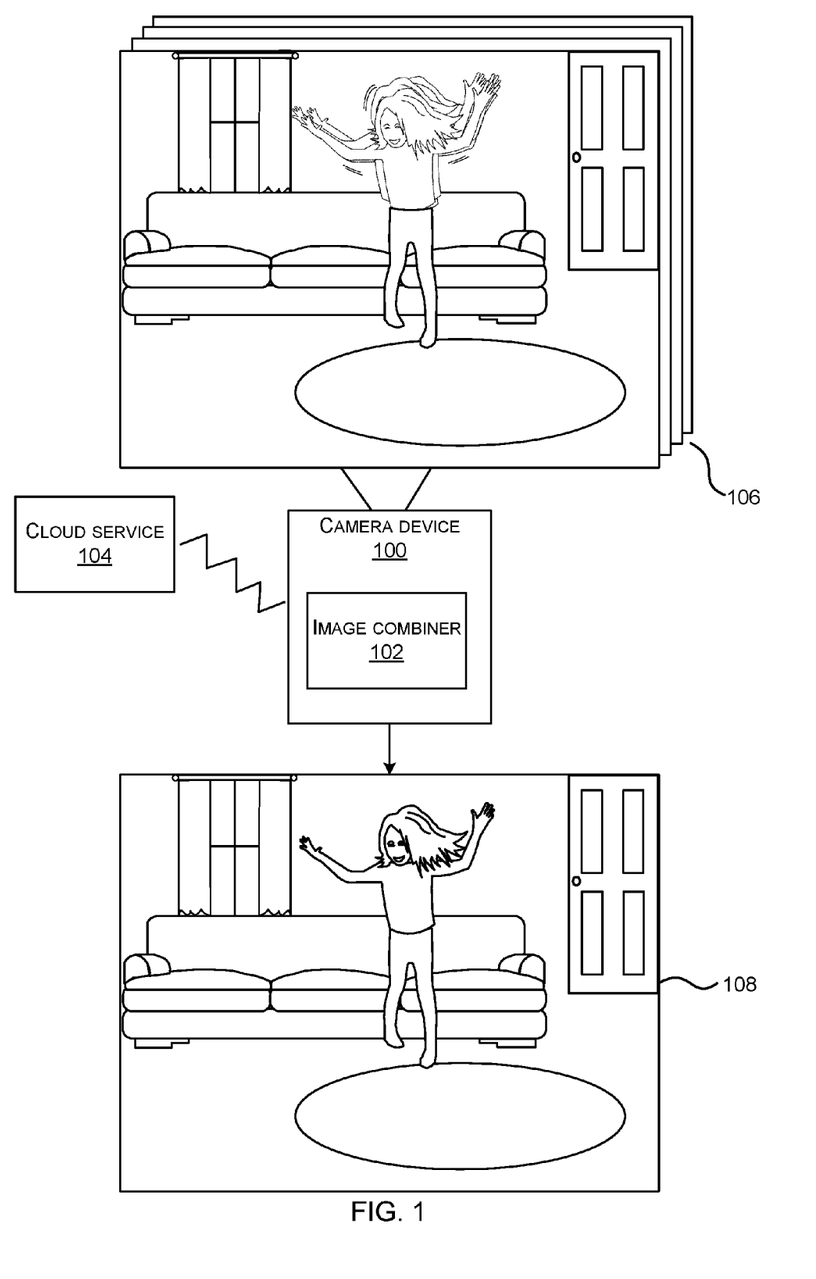
FIG. 1 is a schematic diagram of a plurality of images (also referred to as frames) captured by a camera device and combined to produce an output image.

FIG. 1 is a schematic diagram of a plurality of images (also referred to as frames) 106 captured by a camera device 100 and combined to produce an output image 108. In this example the camera device 100 is a camera phone held by a photographer and used to take a burst of frames 106 depicting a living room scene with a child jumping towards the camera. As the child is moving and the other objects in the scene are still, the position of the pixels depicting the child vary in each of the images of the burst of frames. Also, the child appears blurred in one or more of the frames 106 (as indicated in FIG. 1 the head, arms and hair of the child are blurred in the uppermost frame).

The camera device 100 has an image combiner 102 implemented using any combination of software, hardware and firmware. The image combiner 102 combines information from the individual frames of the burst of frames 106 to produce output image 108. The image combiner 102 selects one of the frames of the burst of frames 106 as a reference frame, aligns the other frames of the burst of frames 106 to the reference frame, and then computes the output image 108 by combining the information.

Approaches which select the reference frame as being the frame which is globally the sharpest frame of the burst of frames 106 perform poorly in situations such as illustrated in FIG. 1. It is recognized herein that this is because the frame which is sharpest overall has a blurred depiction of the child, as the child is a relatively small proportion of the image and the sharpness assessment takes into account the whole image. Such approaches, having selected a reference frame with a blurred depiction of the child go on to produce an output image 108 which also has a blurred depiction of the child. A similar situation occurs where the reference frame is selected as being the frame with the shortest exposure time, as there is no consideration of local regions as part of the reference frame selection process.

The image combiner 102 is configured in some examples to select the reference frame on the basis of any one or more of: local analysis of the frames, content analysis of the frames such as face detection, smile detection, object detection and others, noise analysis of the frames, other sensor information. In some cases more than one reference frame is used. In some cases the reference frame is selected in an iterative process whereby an initial reference frame is later updated.

Alternatively, or in addition, the functionality of the image combiner described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In some cases, the image combiner 102 functionality is located in whole or in part at a cloud service 104 provided by one or more computing devices remote of the camera device 100 and in communication with the camera device 100 over a communications network. For example, the image combiner 102 is able to send the plurality of frames 106 to the cloud service 104 and receive the output image 108 in return. For example, the image combiner 102 is able to send the plurality of frames 106 to the cloud service 104 and receive in response an indication of which of the plurality of frames to use as the reference frame. In that case, the image combiner 102 at the camera device 100 computes the output image 108 itself using the information from the cloud service 104 about which frame is the reference frame.

Figure 2:
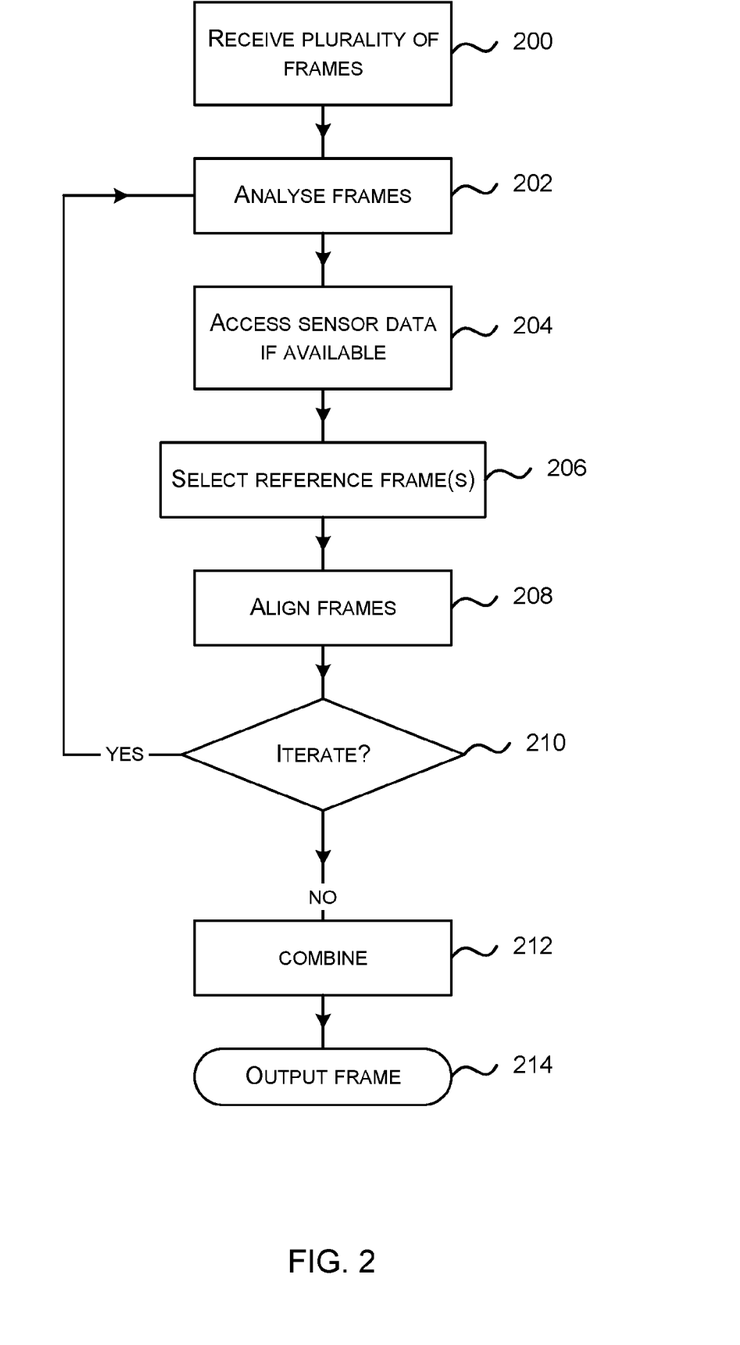
FIG. 2 is a flow diagram of a method of combining a plurality of frames.

FIG. 2 is a flow diagram of a method of combining a plurality of frames. This method is implemented by the image combiner 102 at the camera device 100 or at the cloud service 104 or shared between the camera device 100 and the cloud service 104.

A plurality of frames is received 200 such as the burst of frames 106 of FIG. 1 or a bracket of frames in the case of HDR applications, or any other plurality of frames. The image combiner receives any available metadata associated with the frames such as exposure time or other camera settings used when the frame was captured. The image combiner 102 analyses 202 the frames. Any combination of one or more of the following ways of analyzing the frames is used.

For example, it carries out a local analysis of the frames. A local analysis of a frame is a process which computes characteristics of an individual frame from a region which is part but not the entire frame. The characteristics computed by the local analysis are any image characteristic(s) and a non-exhaustive list of examples is: sharpness, intensity variation, intensity gradient, signal to noise ratio, presence of a face, presence of a smile, object detection, color information, object position (e.g. selecting a reference frame which has an object positioned more centrally as compared with other frames, or selecting a frame where an object is positioned more closely to the golden section rule with relation to other objects in the scene), any weighted combination of one or more image characteristics. Another example is to select the frame which shows a detected object in a particular orientation.

In some cases the region used in the local analysis is pre-configured as a range of pixel locations. For example, the region used in the local analysis is pre-configures as a central region of the frame.

In some cases the region used in the local analysis is dynamically selected on a per-frame basis. For example, the region is specified by a user as a result of user input. For example, the region is computed automatically by the image combiner as being a region of focus of the frame. For example, the region is computed automatically by the image combiner on the basis of content of the image. For example, the region used in the local analysis is computed as being a region depicting an object such as a face, a body or a dog. In some cases the region used in the local analysis is a region depicting a moving object. This is explained in more detail later in this document.

In some cases the image combiner makes a content analysis of the frames such as face detection, smile detection and others. The content analysis is of the whole frame in some cases. In some cases the content analysis is of part but not all of the frame as mentioned above. In some examples the frame in which the largest face is towards the camera is selected as the reference frame.

In some cases the image combiner makes a noise analysis (over the whole frame or only part of the frame) for the frames, such as computing a measure of signal to noise ratio for individual frames. This is especially useful where the frames are taken with different exposure parameters. For example, a least noisy frame with a highest sharpness is selected as the reference frame.

In some case the image combiner makes an analysis of image sharpness over whole frames.

The image combiner accesses 204 sensor data if this is available. For example, the camera device 100 has other sensors in it in some cases, such as gyroscopes, hall-sensors, global positioning system (GPS) sensors, or other sensors. Data from these other sensors is accessed 204 in some cases. For example, data from other sensors which is associated with the time instance when individual ones of the frames were captured.

The image combiner proceeds to select 206 one or more of the received frames as a reference frame. The selection is made based on one or more rules which specify how to select a reference frame using results of the analysis of the frames, optionally frame metadata where available, and optionally sensor data where available.

In an example, a rule specifies that if the task is to combine frames taken with different exposure times, the least globally noisy frame with the highest global sharpness is to be selected as the reference frame.

In an example, a rule specifies that if the task is to combine frames taken with the same camera settings, the frame with the locally sharpest region depicting a face is to be selected as the reference frame.

In an example, a rule specifies that if the task is to combine frames taken with the same camera settings in the presence of significant camera motion as indicated by a gyroscope, then the globally sharpest frame associated with the least camera motion is selected as the reference frame.

In an example, a rule specifies that a frame with the sharpest version of an object which has been identified as moving is chosen. An object is identified as moving in some cases by using preview data or view finder data available at a camera. In this case a sharpness analysis on the region of the moving object is carried out in each frame and used to select the reference frame. This is useful since iterative selection and re-alignment of the reference frame is not needed.

As mentioned above, there is more than one reference frame in some examples. Consider the situation with two reference frames, one having the sharpest depiction of a child and another having the sharpest depiction of a parent. The scene comprises the child and the parent. The part of the reference frame most sharply depicting the parent is used to align regions of target frames depicting the parent. The part of the reference frame most sharply depicting the child is used to align regions of target frames depicting the child.

Given at least one reference frame the remaining frames received at operation 200 are referred to as target frames. The image combiner aligns 208 the target frames to the reference frame as described earlier in this document, using an image registration process. The image combiner takes a decision whether to iterate 210 in order to re-select the reference frame(s). For example, the image combiner is configured to make a fixed number of iterations such as two iterations, or another fixed number of iterations in some cases. In some cases the image combiner decides whether to iterate based on user input. In this case the operations 212 and 214 occur prior to the decision to iterate 210 and the user is able to view the output frame 214 and decide whether to iterate in the hope of receiving a better output frame 214. In some cases the image combiner decides whether to iterate 210 according to whether there is convergence of the output frame 214, that is, little change in the output frame 214 as compared with a previous output frame 214 computed in a previous iteration of the method of FIG. 2. In this case the operations 212 and 214 occur prior to operation 210.

By allowing the process of FIG. 2 to iterate, improved quality of the output frame is achieved. This is because the analysis at operation 202 is able to use the plurality of frames after those frames have been aligned according to one or more initial reference frames. The quality of the analysis at operation 202 is then improved and so is the quality of the reference frame selection operation 206. For example, consider the case illustrated in FIG. 1 where a child is moving in a static scene. Assessing the sharpness of the whole frames leads to poor selection of a reference frame. Assessing the sharpness of the moving object (child) gives a better selection of the reference frame. However, to find the region depicting the moving object in the individual frames requires the frames to be aligned so as to compensate for gross camera motion. Thus by carrying out an iteration of the process of FIG. 2 the initial reference frame is replaced by a reference frame which has the sharpest depiction of the moving object.

The method of FIG. 2 is applicable in the case of more than one reference frame as already mentioned. For example, if there are two moving objects in a scene such as the child of FIG. 1 and another child in the same scene. One child is sharper in one frame and another child is sharper in some other frame. The frames are aligned based on an initial reference frame selection as illustrated in FIG. 2 and the regions which move between the frames are identified (the region depicting child 1 and the region depicting child 2). These regions are found to be isolated from one another. Local analysis is done on the frames for each of the child regions and one reference frame is selected for the region depicting child 1 and another reference frame is selected for the region depicting child 2. Therefore it is possible to have one reference frame in respect of image elements depicting a first object in the scene, and another reference frame in respect to of image elements depicting another object in the scene.

At operation 212 the aligned frames are combined using aggregation, averaging, blending or in other ways. The resulting image is provided as an output frame 214 and is stored in memory, rendered to a display or sent to another entity over a communications network.

Figure 3:
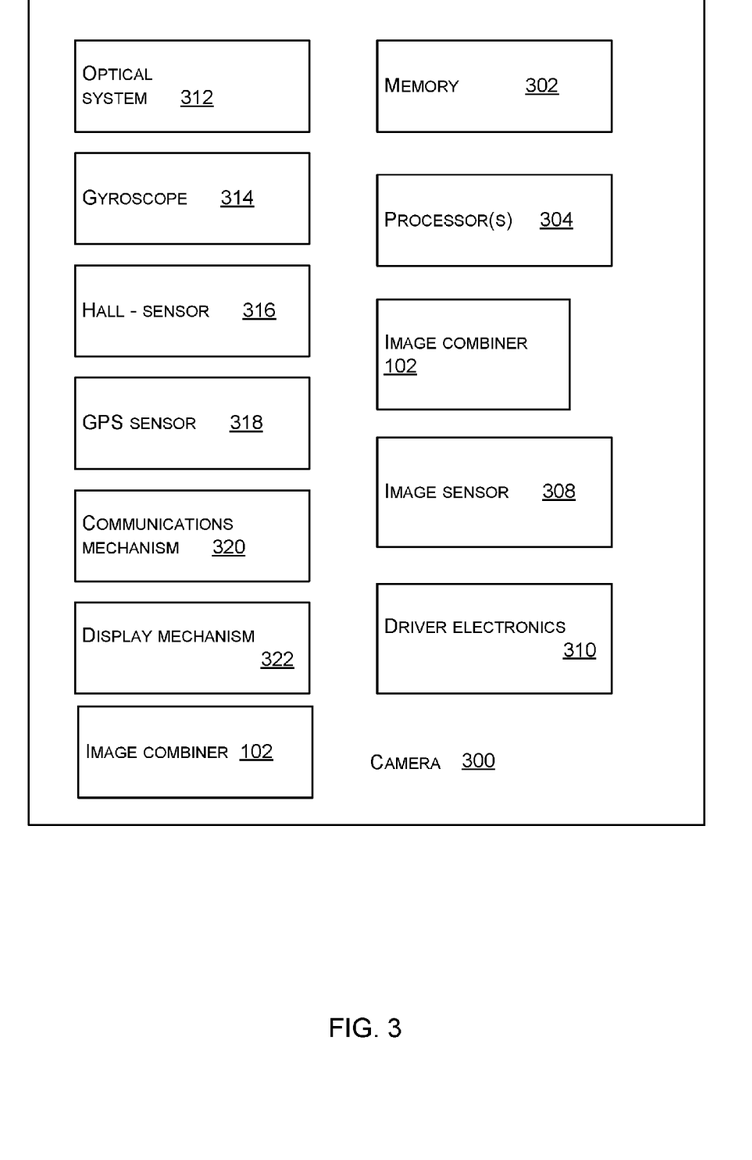
FIG. 3 is a schematic diagram of a camera suitable for combining multiple frames in multi-frame image processing.

In some examples the image combiner 102 is integral with a digital camera 300 as now described with reference to FIG. 3.

A digital camera 300 comprises an image sensor 308 that receives light reflected from objects within the scene. The image sensor 308 comprises a charge-coupled device (CCD) sensor, a complementary metal-oxide-semiconductor (CMOS) sensor, for example a Photonic Mixer Device (PMD) sensor or other appropriate sensor which is arranged to detect light reflected and emitted from objects, people and surfaces within the camera range.

The camera comprises an optical system 312 that is arranged to gather and focus reflected light from the environment on to the image sensor 308. The camera comprises driver electronics 310 which control the image sensor 308 and the optical system 312. An image sensor may be shuttered on and off electronically rather than with physical shutters.

In one example the camera comprises a processor 304 and a memory 320 which stores sensor data from the image sensor 308. Where, an image combiner 120 is at the camera it comprises software stored at memory 302 and executed at processor 304 in some cases. In some examples the image combiner 102 is a field programmable gate array (FPGA) or a dedicated chip. For example, the functionality of the image combiner 102 is implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The camera 300 has a communications mechanism 320 in some examples to enable it to send the frames it captures to another entity. The camera 300 has a display mechanism 322 in some examples to enable it to display the output frames from the image combiner 102 at a display associated with the camera 300. The camera has one or more sensors in some cases, such as a gyroscope 314, a Hall-sensor 316, a GPS sensor 318. In some case an accelerometer is present in the camera.

Figure 4:
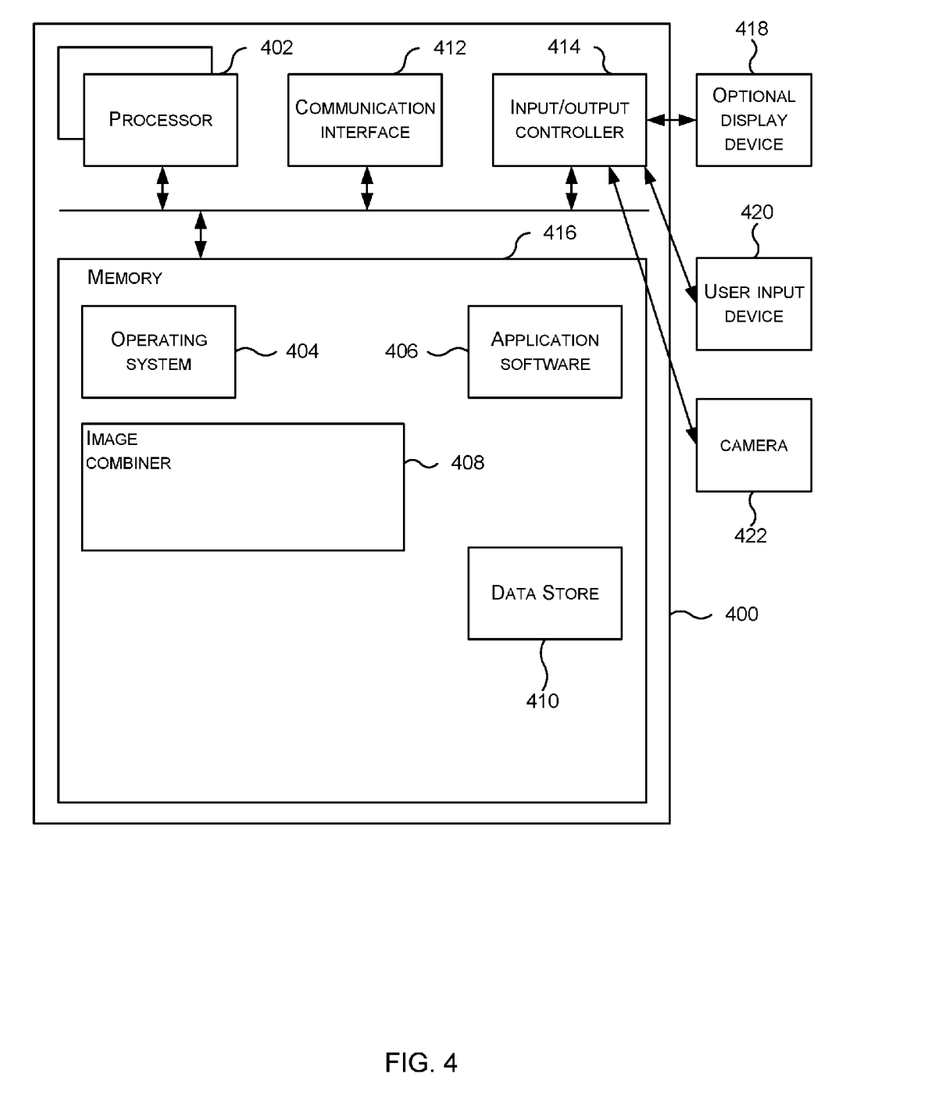
FIG. 4 illustrates an exemplary computing-based device in which embodiments of a system for combining two or more images is implemented.

FIG. 4 illustrates various components of an exemplary computing-based device 400 which are implemented as any form of a computing and/or electronic device, and in which embodiments of an image combiner for combining aligned frames are implemented in some examples.

Computing-based device 400 comprises one or more processors 402 which are microprocessors, controllers or any other suitable type of processors for processing computer executable instructions to control the operation of the device in order to combine a plurality of frames to produce an output frame of higher quality than individual ones of the plurality of frames. In some examples, for example where a system on a chip architecture is used, the processors 402 include one or more fixed function blocks (also referred to as accelerators) which implement a part of the method of FIG. 2 in hardware (rather than software or firmware). Platform software comprising an operating system 404 or any other suitable platform software is provided at the computing-based device to enable application software 406 to be executed on the device. An image combiner 408 comprising software stored in memory 416 for execution on processors 402 is available in some cases to carry out the method of FIG. 2. A data store 410 holds frames, rules, frame metadata, sensor data or other information.

The computer executable instructions are provided using any computer-readable media that is accessible by computing based device 400. Computer-readable media includes, for example, computer storage media such as memory 416 and communications media. Computer storage media, such as memory 416, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 416) is shown within the computing-based device 400 it will be appreciated that the storage is, in some examples, distributed or located remotely and accessed via a network or other communication link (e.g. using communication interface 412).

The computing-based device 400 also comprises an input/output controller 414 arranged to output display information to a display device 418 which may be separate from or integral to the computing-based device 400. The display information may provide a graphical user interface. The input/output controller 414 is also arranged to receive and process input from one or more devices, such as a user input device 420 (e.g. a mouse, keyboard, camera, microphone or other sensor). In some examples the user input device 420 detects voice input, user gestures or other user actions and provides a natural user interface (NUI). This user input may be used to display output frames of the image combiner 408, specify rules to be used by the image combiner 408, select regions of frames for analysis, and select whether to continue with iteration. In an embodiment the display device 418 also acts as the user input device 420 if it is a touch sensitive display device. The input/output controller 414 outputs data to devices other than the display device in some examples, e.g. a locally connected printing device.

A camera 422 is connected to the input/output controller 414 in some examples and captures bursts of frames, brackets of frames or other pluralities of frames to be combined. In some cases more than one camera 422 is connected to the input/output controller 414. For example, one camera is used to capture images for detecting motion of the camera itself and another camera is used to capture pluralities of frames to be combined.

Any of the input/output controller 414, display device 418 and the user input device 420 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An image combiner comprising:
a memory storing two or more frames being images depicting the same scene; and
at least one processor;
the memory holding instructions executable by the processor to:
select at least one of the frames and designate it as a reference frame and to designate the other frames as target frames;
align the target frames to the reference frame;
compute an output image by combining the reference frame and the aligned target frames;
and wherein the process of selecting the reference frame comprises any one or more of: local analysis of characteristics of the frames, face detection, smile detection, object detection, computing signal to noise ratio of individual frames, use of sensor data from at least one non-camera sensor.

The image combiner described above the memory holding instructions executable by the processor to iterate the process of selecting at least one of the frames and designating it as a reference frame.

The image combiner described above wherein the process of selecting the reference frame uses criteria which change between iterations.

The image combiner described above wherein the process of selecting the reference frame uses criteria assessed over whole frames for a first one of the iterations and uses criteria assessed over regions which are less than a whole frame for subsequent ones of the iterations.

The image combiner described above wherein the process of selecting the reference frame uses criteria assessed over whole frames for a first one of the iterations and uses criteria assessed over regions which are less than a whole frame for subsequent ones of the iterations, those regions depicting one or more objects moving in the scene.

The image combiner described above wherein the iteration is carried out prior to computing the output image.

The image combiner described above wherein the iteration is carried out after computation of the output image, and wherein the iteration is triggered by user input.

The image combiner described above wherein the iteration is carried out after computation of the output image and continues until the change in the output image between iterations meets criteria.

The image combiner described above the memory holding instructions executable by the processor to compute a local analysis of characteristics of the frames by analyzing individual regions of the frames where a regions is less than a whole frame.

The image combiner described above the memory holding instructions executable by the processor to compute the local analysis in a predefined region of a frame.

The image combiner described above the memory holding instructions executable by the processor to compute the local analysis in a region of a frame which is selected by user input, or which is computed to depict a specified object, or which is a region of focus of a camera used to capture the frames.

The image combiner described above the memory holding instructions executable by the processor to compute the local analysis by assessing the sharpness of the frames in a region which is less than a whole frame.

The image combiner described above the memory holding instructions executable by the processor to compute the local analysis by assessing the sharpness of the frames in a region which depicts a moving object.

The image combiner described above the memory holding instructions executable by the processor to compute the face detection by finding a frame with a largest face directed towards a camera used to capture the frame.

The image combiner described above wherein the other sensor data comprises data from a gyroscope or a Hall-sensor or a global positioning sensor.

The image combiner described above the memory holding instructions executable by the processor to select two of the frames as reference frames, a first one of the reference frames being in respect of image elements depicting a first object in the scene, and a second reference frame being in respect of image elements depicting another object in the scene.

An image combiner comprising:
means for storing two or more frames being images depicting the same scene; and
means for selecting at least one of the frames and designate it as a reference frame and to designate the other frames as target frames;
means for aligning the target frames to the reference frame;
means for computing an output image by combining the reference frame and the aligned target frames;
and wherein the process of selecting the reference frame comprises any one or more of: local analysis of characteristics of the frames, face detection, smile detection, object detection, computing signal to noise ratio of individual frames, use of sensor data from at least one non-camera sensor.

A computer-implemented method comprising:
receiving two or more frames being images depicting the same scene;
selecting at least one of the frames and designating it as a reference frame and designating the other frames as target frames;
aligning the target frames to the reference frame;
computing an output image by combining the reference frame and the aligned target frames;
and wherein the process of selecting the reference frame is iterated such that the process of selecting the reference frame uses criteria which change between iterations.

The method described above which uses criteria assessed over whole frames for a first one of the iterations and uses criteria assessed over regions which are less than a whole frame for subsequent ones of the iterations.

The method described above wherein the regions depict objects moving in the scene.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The examples illustrated and described herein as well as examples not specifically described herein but within the scope of aspects of the disclosure constitute exemplary means for storing, means for selecting, means for aligning and means for computing. For example, the memory 302 of FIG. 4 or the memory 416 of FIG. 4 constitutes exemplary means for storing two or more frames being images depicting the same scene. For example, the image combiner 102, 408 of FIGS. 1 and 3 and 4 constitutes exemplary means for selecting at least one of the frames and designate it as a reference frame and designating the other frames as target frames; and it also constitutes exemplary means for aligning the target frames to the reference frame, and it also constitutes exemplary means for computing an output image by combining the reference frame and the aligned target frames such that the process of selecting the reference frame comprises any one or more of: local analysis of characteristics of the frames, face detection, smile detection, object detection, computing signal to noise ratio of individual frames, use of sensor data from at least one non-camera sensor.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An image combiner comprising:
   a memory storing two or more frames being images depicting the same scene; and
   at least one processor;
   the memory holding instructions executable by the processor to:
   select at least one of the frames and designate the selected frame as a reference frame and to designate the other frames as target frames;
   align the target frames to the reference frame;
   compute an output image by combining the reference frame and the aligned target frames;
   iterate the selection of the at least one of the frames and the designation of the selected frame as a reference frame, and wherein the iteration is carried out prior to computing the output image; and
   wherein the selection of the reference frame comprises any one or more of: local analysis of characteristics of the frames, face detection, smile detection, object detection, computing signal to noise ratio of individual frames, use of sensor data from at least one non-camera sensor.

2. The image combiner of claim 1 wherein the selection of the reference frame changes between iterations.

3. The image combiner of claim 1 wherein the selection of the reference frame is assessed over whole frames for a first one of the iterations and is assessed over regions which are less than a whole frame for subsequent ones of the iterations.

4. The image combiner of claim 1 wherein the selection of the reference frame is assessed over whole frames for a first one of the iterations and is assessed over regions which are less than a whole frame for subsequent ones of the iterations, those regions depicting one or more objects moving in the scene.

5. The image combiner of claim 1 wherein the iteration is triggered by user input.

6. The image combiner of claim 1 the memory holding instructions executable by the processor to compute a local analysis of characteristics of the frames by analyzing individual regions of the frames where a region is less than a whole frame.

7. The image combiner of claim 1 the memory holding instructions executable by the processor to compute the local analysis in a predefined region of a frame.

8. The image combiner of claim 1 the memory holding instructions executable by the processor to compute the local analysis in a region of a frame which is selected by user input, or which is computed to depict a specified object, or which is a region of focus of a camera used to capture the frames.

9. The image combiner of claim 1 the memory holding instructions executable by the processor to compute the local analysis by assessing a sharpness of the frames in a region which is less than a whole frame.

10. The image combiner of claim 1 the memory holding instructions executable by the processor to compute the local analysis by assessing a sharpness of the frames in a region which depicts a moving object.

11. The image combiner of claim 1 the memory holding instructions executable by the processor to compute the face detection by finding a frame with a largest face directed towards a camera used to capture the frame.

12. The image combiner of claim 1 wherein the other sensor data comprises data from a gyroscope or a Hall-sensor or a global positioning sensor.

13. The image combiner of claim 1 the memory holding instructions executable by the processor to select two of the frames as reference frames, a first one of the reference frames being in respect of image elements depicting a first object in the scene, and a second reference frame being in respect of image elements depicting another object in the scene.

14. An image combiner comprising:
means for storing two or more frames being images depicting the same scene; and
means for selecting at least one of the frames and designate the selected frame as a reference frame and to designate the other frames as target frames;
means for aligning the target frames to the reference frame;
means for computing an output image by combining the reference frame and the aligned target frames;
means for iterating the selection of the at least one of the frames and the designation of the selected frame as a reference frame, wherein the iterating is carried out prior to computing the output image; and
wherein the selection of the reference frame comprises any one or more of: local analysis of characteristics of the frames, face detection, smile detection, object detection, computing signal to noise ratio of individual frames, use of sensor data from at least one non-camera sensor.

15. A computer-implemented method comprising:
receiving two or more frames being images depicting the same scene;
selecting at least one of the frames and designating the selected frame as a reference frame and designating the other frames as target frames;
aligning the target frames to the reference frame;
computing an output image by combining the reference frame and the aligned target frames;
iterating the selection of the at least one of the frames and the designation of the selected frame as a reference frame, wherein the iterating is carried out prior to computing the output image; and
wherein the selection of the reference frame comprises any one or more of: local analysis of characteristics of the frames, face detection, smile detection, object detection, computing signal to noise ratio of individual frames, use of sensor data from at least one non-camera sensor.

16. The method of claim 15 wherein the selection of the reference frame is assessed over whole frames for a first one of the iterations and is assessed over regions which are less than a whole frame for subsequent ones of the iterations.

17. The method of claim 16 wherein the regions depict objects moving in the scene.

18. The method of claim 15 wherein the selection of the reference frame changes between iterations.

19. The method of claim 18 wherein at least one of the iterations is triggered by user input.

20. The method of claim 15 further comprising computing the local analysis in a predefined region of a frame.

* * * * *